United States Patent [19]

Goddard

[11] Patent Number: 5,040,887

[45] Date of Patent: Aug. 20, 1991

[54] OPTICAL INSTRUMENT FOR AIDING EYESIGHT

[76] Inventor: Sydney L. Goddard, 1034 N. Broadway, Haverhill, Mass. 01830

[21] Appl. No.: 556,110

[22] Filed: Jul. 20, 1990

[51] Int. Cl.⁵ .............................................. G02C 7/16
[52] U.S. Cl. ...................................... 351/45; 351/41; 351/158
[58] Field of Search ...................... 351/41, 158, 53, 45, 351/46; 350/275, 319; 2/433

[56] References Cited

U.S. PATENT DOCUMENTS 1,567,498  12/1925  Gaugler ................................ 351/53

Primary Examiner—Rodney B. Bovernick

[57] ABSTRACT

An optical instrument comprises a housing having a viewing aperture at the proximal end and an opening at the distal end for entry of light. A body in the housing rotates on an axis normal to the optical axis. The body has a pair of segments having linear edges parallel to the plane defined by the axis of rotation and the optical axis. As the body rotates in one direction both edges advance toward the plane, and as the body rotates in the opposite direction the edges diverge from the plane. Preferably the body comprises two sections of a circular cylinder coaxial with the axis of rotation, the segments approximately about ninety degrees each about their common axis of rotation. The edges of the members define the opening for admission of light for viewing at the viewing aperture, and may reduce or enlarge the opening according to the positioning of the members.

8 Claims, 1 Drawing Sheet

OPTICAL INSTRUMENT FOR AIDING EYESIGHT

BACKGROUND OF THE INVENTION

1. Field of the Invention

The invention relates to optical instruments, and more particularly to instruments which aid viewing.

2. Description of Related Art

It is known that under many circumstances viewing may be enhanced by instruments which restrict the field of view. Among U.S. Patents which seek to improve viewing in this way, the following are representative:

U.S. Pat. No. 854,546 to Verdeau, May 21, 1907, for "EYE PROTECTOR" shows a mask with light restrictive horizontal eye slots 7.

U.S. Pat. No. 1,067,793 to Barr, July 22, 1913, for "AUTOMOBILE GOGGLES" shows a pair of eye shields each having a horizontal cut out slot 8.

U.S. Pat. No. 1,712,360 to Slaughter, May 7, 1929 for "SPECTACLES" shows an element 8 which has a longitudinal horizontal slot 14 registering with a slot 10 and element 22 have a longitudinal slot 24 which registers with slot 10 and opening 14. Finally a peep hole 18 further restricts the field of view.

U.S. Pat. No. 1,954,184 to Schlumbohm, Apr. 10, 1934, for "OPTICAL DEVICE" shows a short tube 2 projecting from a glass plate 7. The tube 10 has a horizontal slot or opening 2 to restrict light input to the eye.

U.S. Pat. No. 1,982,650 to Fletcher, Dec. 4, 1934, for "OPTICAL DEVICE" shows rims of a pair of glasses each provided with a diaphragm 12 having a horizontal slot and a forward projecting tube in registry with the slot.

U.S. Pat. No. 1,983,312 to Schlumbohm, Dec. 4, 1934, for "OPTICAL DEVICE" is similar to the above mentioned Schlumbohm U.S. Pat. No. 1,954,184 in restricting by a tube with a horizontal slot light entering the eye.

These patents seek to control the entry of undesired light to the eye either by using a horizontal slit, which affords no adjustment to ambient light conditions, or a peep hole which greatly restricts the field of view and also may greatly restrict the amount of light. The use of electronics requires a power supply and esoteric materials.

SUMMARY OF THE INVENTION

According to the invention, an optical instrument comprises a housing having a viewing aperture at one end and at another distal end an opening for the entry of light to follow the optical axis to the viewing aperture. A body in the housing rotates on an axis, the optical axis being normal to the axis of rotation. The body has a pair of opposed segments having linear edges parallel to plane defined by the axis of rotation and the optical axis. As the body is rotated in one direction both edges advance toward the plane and when the body is rotated in the opposite direction the edges diverge from the plane, admitting less or more light accordingly. Preferably the body comprises two sections of circular cylinder coaxial with the axis of rotation, the segments approximating ninety degrees about the common axis of rotation.

The instrument according to the invention may be simple, easy to manufacture, light in weight, and affords a ready way to control entry of ambient light to the eye of the user individually and easily.

BRIEF DESCRIPTION OF THE DRAWINGS

This invention is pointed out with particularity in the appended claims. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
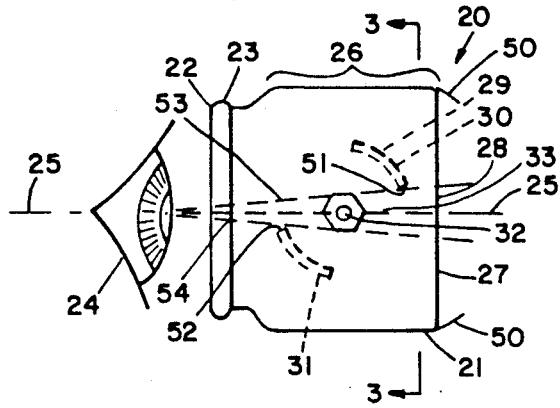
FIG. 1 is a side view of an embodiment of the invention.
Figure 2:
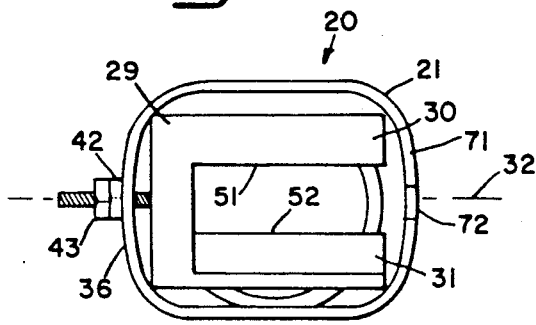
FIG. 2 is an end view from the distal light entry end.
Figure 3:
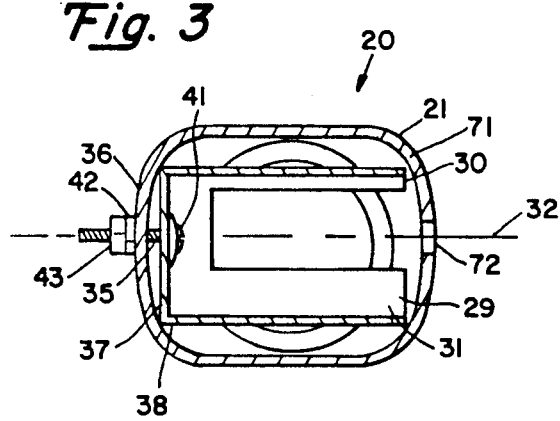
FIG. 3 is a sectional view taken along the lines 3—3 of FIG. 1.

Referring now to FIGS. 1-3, an optical instrument 20 embodying the invention comprises a housing 21. The housing 21 has at one end a viewing aperture 22 surrounded by a proximal annular ring 23 which may be used to seat and thus position the instrument 20 against the surround about the eye 24 of the observer. The optical axis 25 of the instrument is essentially coaxial with the eye 24 and the ring 23. The housing 21 further comprises a forward section 26 which has a distal end 27 having an opening 28 for the entry of light to travel along the optical axis 25.

A body 29 housed within the housing 21 comprises a pair of segments, one 30 as shown being the distal and the other 31 as proximal with respect to the eye 24 and ring 23. 30, 31 are rotatable about an axis 32 of rotation. In this instance, the segments 30 and 31 are segments of a circular cylinder coaxial with the axis 32 of rotation. The segments 30 and 31 are positioned on opposite sides of the plane 33 defined by the axis 32 of rotation and the optical axis 25 and indicated only by dotted line portions in FIG. 1, the one segment 30 being above the other segment 31 being below the plane 33.

A shaft 35 is journalled into a side wall 36 of the housing 21, the shaft axis being coaxial with the axis 32 of rotation. The shaft 35 extends along the axis 32 of rotation only briefly into the housing 21, and supports a substantially flat circular member or disc 37 slightly dished extending at right angles to the axis 32 of rotation and then bending into a complete circular cylinder section 38 extending away from the side wall 36 shortly and joined to the segments 30, 31, being the sections of the cylinder between segments 30, 31 being absent, and the end of the cylinder opposite the disc 37 being absent. These absent cylinder sections may be, for example, about ninety degrees each of what would be the complete cylinder, the segments 30, 31 each being about ninety degrees. By forming the disc 37, section 38, and segments 30, 31 in a unitary or single piece, a very light material may be used, the disc 37 and circular cylindrical section 38 tending to lend rigidity At the same time the complete side or disc 37 excludes undesired stray light or reflections.

As best seen in FIGS. 2 and 3, the housing 21 has another side wall 71 having an open aperture 72 which allows greater peripheral sight. The aperture 72 may be covered with a shaded material 73 such as shaded glass or plastic.

Figure 5:
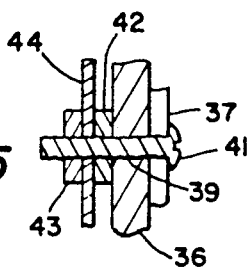
FIG. 5 is a partial schematic view in cross-section illustrating a preferred control for separation of the segments.

FIG. 5 illustrates in detail the mounting of the shaft 35. The shaft or screw 35 acting as the shaft fits in an aperture 39 in the side wall 36 which serves as the bearing for the shaft. The head 41 of the screw bears against the side wall 36 closely to confine the disc 37 in fictional engagement against the side wall 36. A first nut 42 bears against the side wall 36, but not tightly. A second nut 43 screwed tightly against the first nut 42 keeps the first nut 42 in place, the first nut 42 being frictionally engaged against the side wall 36. The screw head 41 may be fastened to the disc 37 by any suitable means as by an adhesive. Thus the shaft 35 may be rotated by the fingers against the nuts 42, 43 to a desired position, where it will remain by force of friction until again rotated. The open end of the cylinder 38 is close to the adjacent housing wall to restrict unwanted light.

The cross-sectional view of FIG. 5 illustrates a preferred detail for the mounting of the shaft 35 and a preferred means for manipulating the segments 30, 31. In FIG. 5 a wheel 44 is tightly contained between the nut 42 and the nut 43. The wheel has a sufficiently large diameter so that it is easy to apply the required torque to adjust the spacing of the segments 30, 31. Further the wheel 44 being of larger diameter than the nuts 42, 43 makes slight adjustments for the separation between the segments 30, 31 easy and accurate.

As best seen in FIG. 1, the housing may have wings such as 50 or the like extending normally to the optical axis 25 to exclude unwanted light, yet not extending sufficiently far to obstruct any light which it may be desired to have enter along the optical axis 25. It is desirable to restrict so far as possible the access of light to the eye to that which passes between the two segments 30, 31. The entire interior of the housing 21 is therefore black as is the exterior of the segments 30, 31, the disc 37, and any other parts likely to reflect light in the interior of the housing, such as even the head of the screw or shaft 35.

The operation of the instrument 20 will be clear from what has been pointed out above. The user places the ring 23 to the eye for example eye 24. The light available to the eye 24 is now restricted to that passing below the lower edge 51 of the upper segment 30 (as viewed in FIG. 1 and the upper edge 52 of the lower segment 31, as indicated by the dotted lines 53 and 54 respectively. The instrument 20 may be inverted; the lower segment 31 would then become the upper, proximal segment 30 and the segment 31 would become the lower, distal segment. There would be no difference in operation, even though the angles demarcated between the dotted lines 53 and 54 and plane 33 when projected to the pupil of the eye 24 are slightly different owing to the different distances to the pupil of the eye of the edges.

As the instrument 20 is illustrated herein, the field of view is horizontal. The field may be restricted vertically (or at any angle to the horizontal) by rotating the cylindrical segments 30 and 31 clockwise, as viewed in FIG. 1, about the optical axis 25 or enlarged vertically by rotating the segments 30, 31 counterclockwise. The viewing field is illustrated as horizontal, because that would be the normal way to use the instrument 20. The width of the field is determined by the horizontal dimension of the viewing aperture 22 taking into account any light barriers used. Nevertheless by orienting the instrument 20 at ninety degrees about the optical axis 25 from the orientation shown, the viewing aperture would be vertically fixed and the horizontal aperture 22 would then be varied at will by turning the shaft the axis of rotation of which would then be vertical.

Figure 4:
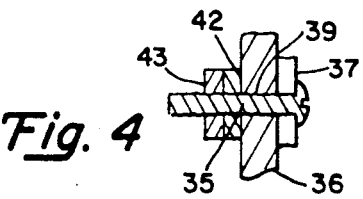
FIG. 4 is a partial schematic view in cross-section illustrating the detail of a control for the separation of the segments.
Figure 6:
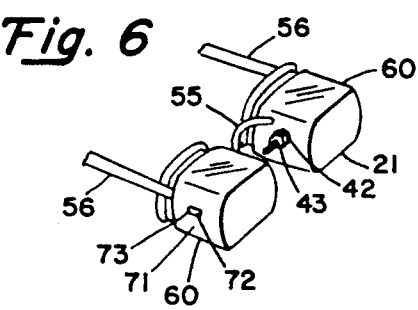
FIG. 6 is a perspective view, somewhat schematic illustrating a binocular embodiment of the invention.

As illustrated in FIG. 6, the instrument 20 could be adapted for binocular vision, by using two instruments as indicated somewhat schematically in FIG. 4, with the adjustments of the rotation by means of the shafts being independent. For example, tow instruments 60 may be arranged for dual mounting with a bridge 55 and side supports 56 or an elastic head band (not shown). The means for rotating the segments 30, 31 for each might then be independently located on each outer edge, opposite the bridge 55.

The preferred embodiment of applicant's optical instrument includes the shaft and first and second bolts 42 and 43 on the nose side of the housing 21.

The instrument of the invention may be manufactured economically operates to reduce or enlarge the field cf view in accordance with ambient light conditions, improving the viewer's comfort and possibly improving the viewer's vision. The reduction of excessive light for someone troubled with a cataract or certain other eye conditions leads to more comfortable vision. The instrument according to the invention affords a highly desirable ability to enlarge or restrict the field of view in an easy and ready manner, without resort to expensive electronic devices or complicated arrangements or minute or fixed and inalterable fields of view.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. An optical instrument for aiding the eyesight, comprising:

a housing having a viewing aperture at one end and having another end distal from the viewing aperture with an opening for the entry of light, the housing having an optical axis between eye and the viewing aperture;

a body in the housing rotatable about an axis of rotation normal to the optical axis, the axis of rotation and the optical axis defining a plane, the body having a pair of segments on opposite sides of the plane one segment being proximal in the direction of the optical axis and the other distal in the direction of the optical axis with respect to the viewing aperture;

the segments each having a linear edge parallel to the axis of rotation so that when the body is rotated in ore direction both edges advance toward the plane between them and when rotated in the opposite direction the edges diverge from the plane, whereby control of the degree of rotation controls access of light along the optical axis from the entry aperture to the viewing aperture.

2. An optical instrument as claimed in claim 1 wherein the housing internally and the segments externally being black to avoid light reflections.

3. An optical instrument as claimed in claim 1:

the segments being in the form of a right circular cylinder centered axially on the axis of rotation.

4. An optical instrument as claimed in claim 3, further comprising:

a shaft on which the body is mounted, the housing having an aperture in which the shaft is journalled for the rotation of the body.

5. An optical instrument as claimed in claim 4 further comprising:

an extension radially of the axis of rotation to which the shaft is connected and holding the segments.

6. An optical instrument as claimed in claim 5 further comprising:

a wheel fastened to the shaft for control of the separation of the edges.

7. An optical instrument as claimed in claim 1 wherein the housing has an open aperture on one side.

8. An optical instrument as claimed in claim 7 wherein the open aperture is covered by a shaded material.

* * * * *